United States Patent
Helard et al.

(10) Patent No.: US 8,804,861 B2
(45) Date of Patent: Aug. 12, 2014

(54) PEAK-TO-AVERAGE POWER RATIO REDUCTION IN A MULTICARRIER SIGNAL

(75) Inventors: Jean-Francois Helard, Rennes (FR); Yves Louet, Betton (FR); Irene Masinjara Mahafeno, Plaisance-du-Touch (FR)

(73) Assignees: Institut National des Sciences Appliquees de Rennes, Rennes Cedex (FR); Centre National de la Recherche Scientifique, Paris Cedex (FR)

( * ) Notice: Subject to any disclaimer, the term of this patent is extended or adjusted under 35 U.S.C. 154(b) by 81 days.

(21) Appl. No.: 13/318,853

(22) PCT Filed: May 4, 2010

(86) PCT No.: PCT/EP2010/056053
§ 371 (c)(1),
(2), (4) Date: Feb. 22, 2012

(87) PCT Pub. No.: WO2010/128057
PCT Pub. Date: Nov. 11, 2010

(65) Prior Publication Data
US 2012/0140836 A1    Jun. 7, 2012

(30) Foreign Application Priority Data
May 4, 2009    (FR) .................................... 09 52964

(51) Int. Cl.
*H04L 27/28*    (2006.01)
(52) U.S. Cl.
USPC ........... 375/260; 375/208; 375/261; 375/267; 375/295; 375/299
(58) Field of Classification Search
CPC ..... H04L 27/262; H04L 27/2618; H04L 1/04; H04L 27/2614; H04L 2025/03414; H04B 1/69; H04B 2201/70706
USPC .......... 375/208, 260, 261, 265, 267, 295, 299
See application file for complete search history.

(56) References Cited

U.S. PATENT DOCUMENTS 7,194,039 B2 *    3/2007    Hunton ........................ 375/260
7,664,010 B2 *    2/2010    Kowalski et al. ............. 370/208
(Continued)

OTHER PUBLICATIONS

International Search Report dated Aug. 27, 2010 for corresponding International Application No. PCT/EP2010/056053, filed May 4, 2010.*

(Continued)

*Primary Examiner* — Daniel Washburn
*Assistant Examiner* — Amneet Singh
(74) *Attorney, Agent, or Firm* — David D. Brush; Westman, Champlin & Koehler, P.A.

(57) ABSTRACT

A method and apparatus for multicarrier transmission of a signal representing a source signal. The source signal includes symbols including a set of subcarriers, transmitted simultaneously and having pilot subcarriers intended for at least one processing operation for assisting and/or improving decoding in at least one receiver, and data subcarriers, the location in time-frequency space and a reference value of the pilot subcarriers being known to the at least one receiver. The method of transmission includes: a phase of modifying, for a given symbol, the reference value of at least one subset of the pilot subcarriers, by correction data configured to correct phase and/or amplitude for each of the pilot subcarriers of the subset, so as to minimize peak-to-average power ratio, the correction data taking at least three distinct values, a transition between the values of two successive pilot subcarriers of the subset on a frequency axis being constant.

21 Claims, 4 Drawing Sheets

(56) References Cited

U.S. PATENT DOCUMENTS

| | | | |
|---|---|---|---|
| 7,697,412 B2* | 4/2010 | Anderson et al. | 370/208 |
| 7,715,492 B2* | 5/2010 | Seki | 375/295 |
| 7,746,766 B2* | 6/2010 | Kowalski et al. | 370/208 |
| 7,916,694 B2* | 3/2011 | Paulraj | 370/330 |
| 8,045,447 B2* | 10/2011 | Bitran et al. | 370/208 |
| 8,059,738 B2* | 11/2011 | Kwon et al. | 375/261 |
| 8,098,744 B2* | 1/2012 | Chen et al. | 375/260 |
| 8,355,466 B2* | 1/2013 | Kleider et al. | 375/316 |
| 8,379,752 B2* | 2/2013 | Kleider et al. | 375/267 |
| 2002/0006169 A1* | 1/2002 | Hunton | 375/295 |
| 2002/0191709 A1* | 12/2002 | Hunton | 375/295 |
| 2003/0165131 A1* | 9/2003 | Liang et al. | 370/342 |
| 2004/0136314 A1* | 7/2004 | Jung et al. | 370/203 |
| 2005/0100108 A1* | 5/2005 | Yun et al. | 375/260 |
| 2005/0238110 A1* | 10/2005 | Yun et al. | 375/260 |
| 2005/0265479 A1* | 12/2005 | Fujii et al. | 375/303 |
| 2006/0007850 A1* | 1/2006 | Park et al. | 370/209 |
| 2006/0028976 A1* | 2/2006 | Park et al. | 370/203 |
| 2006/0078066 A1* | 4/2006 | Yun et al. | 375/299 |
| 2006/0274868 A1* | 12/2006 | Chen et al. | 375/347 |
| 2007/0004465 A1* | 1/2007 | Papasakellariou et al. | 455/571 |
| 2007/0018722 A1* | 1/2007 | Jaenecke | 330/149 |
| 2007/0019537 A1* | 1/2007 | Paulraj | 370/203 |
| 2007/0071120 A1* | 3/2007 | Talwar | 375/260 |
| 2007/0092017 A1* | 4/2007 | Abedi | 375/260 |
| 2007/0189334 A1* | 8/2007 | Awad | 370/491 |
| 2008/0074990 A1* | 3/2008 | Kowalski et al. | 370/206 |
| 2008/0101502 A1* | 5/2008 | Navidpour et al. | 375/296 |
| 2008/0112496 A1* | 5/2008 | Devlin et al. | 375/260 |
| 2008/0298490 A1* | 12/2008 | Yun et al. | 375/260 |
| 2008/0310484 A1* | 12/2008 | Shattil | 375/146 |
| 2009/0003308 A1* | 1/2009 | Baxley et al. | 370/350 |
| 2009/0052561 A1* | 2/2009 | Baxley et al. | 375/260 |
| 2009/0060070 A1* | 3/2009 | Hayase et al. | 375/260 |
| 2009/0103639 A1* | 4/2009 | Sankabathula et al. | 375/260 |
| 2009/0129502 A1* | 5/2009 | Tong et al. | 375/299 |
| 2010/0034186 A1* | 2/2010 | Zhou et al. | 370/344 |
| 2010/0080311 A1* | 4/2010 | Moffatt et al. | 375/260 |
| 2010/0091900 A1* | 4/2010 | Gan | 375/267 |
| 2011/0075745 A1* | 3/2011 | Kleider et al. | 375/260 |
| 2011/0206207 A1* | 8/2011 | Priotti | 380/287 |
| 2012/0093248 A1* | 4/2012 | Kwon et al. | 375/261 |

OTHER PUBLICATIONS

Mahafeno, I.M.; Louet, Y.; Helard, J., "PAPR reduction method for OFDM systems using dedicated subcarriers: a proposal for the future DVB-T standard," Broadband Multimedia Systems and Broadcasting, 2008 IEEE International Symposium on , vol., No., pp. 1,3, Mar. 31, 2008-Apr. 2, 2008.*

European Patent Office correspondence on EP2428012 from Sep. 3, 2010 to Mar. 17, 2014 for corresponding French Application No. FR 0952964, filed May 4, 2009.*

Yves Louet et al., "PMEPR Mitigation Using Adjacent Bands of Standards Under Spectrum Mask Constraint" Wireless Conference, 2008. EW 2008. 14th European, IEEE, Piscataway, N J, USA, Jun. 22, 2008, pp. 1-4, XP031320056.*

Garcia et al., "Peak Power Reduction for OFDM Systems with Orthogonal Pilot Sequences" IEEE Transactions on Wireless Communications, vol. 5, Jan. 2006, pp. 47-51.*

Fernandez-Getino Garcia, M.J.; Paez-Borrallo, J.M.; Edfors, O., "Orthogonal pilot sequences for peak-to-average power reduction in OFDM," Vehicular Technology Conference, 2001. VTC 2001 Fall. IEEE VTS 54th , vol. 2, No., pp. 650,654 vol. 2, 2001.*

Mahafeno I. M. et al., "PAPR Reduction Method for OFDM Systems Using Dedicated Subcarriers: a proposal for the future DVB-T Standard" Broadband Multimedia Systems and Broadcasting, 2008 IEEE International Symposium on, IEEE, Piscataway, NJ, USA, Mar. 31, 2008, pp. 1-3, XP031268626.

Yves Louet et al., "PMEPR Mitigation Using Adjacent Bands of Standards Under Spectrum Mask Constraint" Wireless Conference, 2008. EW 2008. 14th European, IEEE, Piscataway, NJ, USA, Jun. 22, 2008, pp. 1-4, XP031320056.

French Search Report dated Dec. 16, 2009 for corresponding French Application No. FR 0952964, filed May 4, 2009.

* cited by examiner

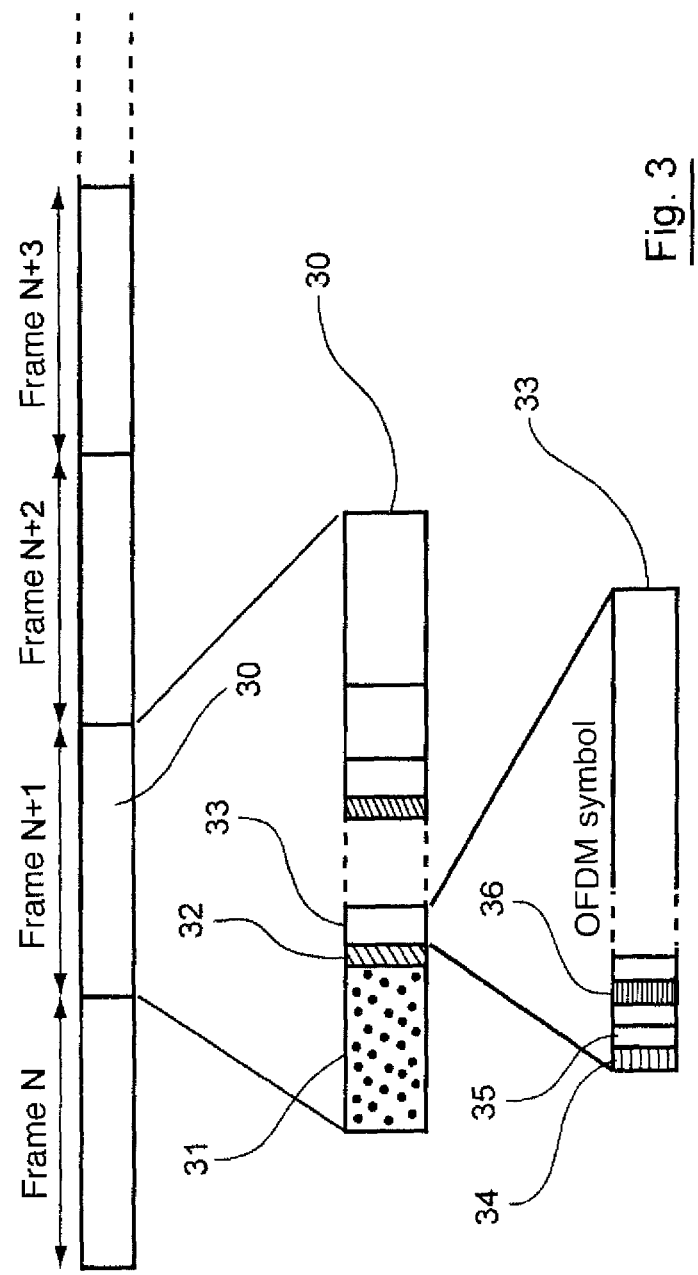

US 8,804,861 B2

PEAK-TO-AVERAGE POWER RATIO REDUCTION IN A MULTICARRIER SIGNAL

CROSS-REFERENCE TO RELATED APPLICATIONS

This application is a Section 371 National Stage Application of International Application No. PCT/EP2010/056053, filed May 4, 2010 and published as WO 2010/128057 on Nov. 11, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission of digital signals, whether on multiple-path transmission channels or on so-called "single-path" channels, such as those of echo-free satellite links in particular.

More precisely, the disclosure concerns multicarrier modulation techniques, in particular of the OFDM ("Orthogonal Frequency Division Multiplex") type. OFDM modulation is being used more and more for digital transmission, in particular on multiple-path transmission channels. This multicarrier modulation technique makes it possible in particular to eliminate interference between symbols generally observed when a multicarrier modulation is used on a multiple-path channel.

Because of its intrinsic robustness on frequency-selective channels, OFDM modulation is in particular, but not exclusively, used in local wireless networks (WiFi or WiMAX), or ADSL ("Asymmetric Digital Subscriber Line") and HIPERLAN/2 ("High Performance Radio Local Area Network"), but also for standards such as those relating to digital audio broadcasting (DAB), digital video broadcasting (DVB), in particular DVB-T (a terrestrial digital television standard) or the new DVB-T2 standard or DVB-NGH ("DVB—Next Generation Handheld", a video broadcast standard intended for reception on mobile terminals).

BACKGROUND OF THE DISCLOSURE

1. Drawbacks of OFDM Modulation

A major drawback of the OFDM technique is inherent in the strong fluctuations in amplitude of the envelope of the modulated signal and therefore in high variations in instantaneous power.

The peak-to-average power ratio (PAPR) of the signals sent is thus generally very high and increases with the number of subcarriers N.

Power amplifiers have non-linear characteristics which, coupled with the amplification of the so-called high PAPR signals, lead to distortions: spectral regrowth of the secondary-lobes level, generation of harmonics, creation of interference between non-linear symbols, creation of interference between carriers. Thus these distortions give rise in particular to transmission errors and degradation in the bit error rate (BER).

2. Prior Art for Reduction in the PAPR

In the literature, numerous techniques have already been proposed for overcoming this problem.

A usual solution consists of ensuring that the operating range of the amplifier remains limited to a linear amplification region, which unfortunately limits the efficiency of the amplifier (a few % instead of, conventionally, 50%) and therefore a significant increase in the power consumption of the emitter. This is a very high constraint in the use of OFDM, in particular in mobile terminals, since the consumption of the power amplifier may represent more than 50% of the total consumption of a terminal.

A second approach is the "clipping" technique, which consists of clipping the amplitude of the signal when it exceeds a predefined threshold. However, this clipping is by nature non-linear and introduces a distortion in the signal sent, resulting not only in a degraded BER but also a regrowth of secondary lobes of the PSD (Power Spectral Density).

A third technique, referred to as "selected mapping", consists of applying a phase rotation to each symbol in the sequence to be transmitted. Several phase rotation patterns may be defined. For each pattern applied to the sequence to be transmitted, the operations are performed for obtaining a corresponding OFDM signal, and the one having the lowest PAPR is transmitted. Once again this technique does not give any distortion, but it requires communicating to the receiver the rotation sequence used on transmission with very high reliability, which leads to a reduction in the spectral efficiency and a significant increase in the complexity of the system for routing the number of the pattern used via a dedicated channel. In addition, if this transmission is erroneous, the entire OFDM frame will be lost. It also increases the complexity on transmission, since several processing operations must be performed in parallel, in order then to choose the most effective. The other processing operations have been performed unnecessarily, and are not used.

A fourth method, usually referred to as "TR technique" (Tone Reservation), proposes to reserve certain subcarriers of the OFDM multiplex, which do not transport information but symbols optimised on transmission in order to reduce the PAPR. These symbols can be optimised by using for example a convex optimisation algorithm of the SOCP (Second Order Cone Programming) type. Just like the previous method, this solution does not cause any distortion to the transmitted signal, but a major drawback of this method lies in the fact that a certain number of carriers must be reserved to be able to reduce the PAPR significantly. These carriers are not used for transmitting useful information data, which leads to a reduction in the spectral efficiency.

This reduction in the spectral efficiency may be solved by the use of so-called "pilot" carriers, initially dedicated to channel estimation, for reducing the PAPR, with on reception a so-called "blind" detection, as proposed in the document "Peak Power Reduction for OFDM Systems With Orthogonal Pilot Sequences" (M. J. Fernandes-Getino Garcia, O. Edfors, J. M. Paez-Borrallo, IEEE Transactions on Wireless Communications, Volume 5, January 2006, pages 47-51).

This document describes such a technique applied to orthogonal pilot sequences, in particular Walsh-Hadamard sequences, which consequently imposes the choice of pilot carriers in a set of two distinct values (−1 and 1) predefined on transmission, so that the sequences are orthogonal to each other.

However, the efficacy of such a technique is limited. Indeed, this technique imposes on transmission a limited choice of pilot carrier modifications in a set of predefined values, thus limiting the performance of this technique in terms of PAPR reduction. Indeed, the pilot carriers modified by this technique are those that best reduce the PAPR, among predefined values, rather than those that reduce the PAPR optimally.

SUMMARY

An embodiment of the disclosure relates to a method for the multicarrier transmission of a signal representing a source signal, comprising symbols consisting of a set of subcarriers, intended to be transmitted simultaneously and comprising pilot subcarriers intended for at least one processing operation for assisting and/or improving the decoding in at least one receiver, and data subcarriers, the location in time-frequency space and a reference value of said pilot subcarriers being known to the receiver or receivers.

According to an embodiment of the invention, the method comprises a phase of modifying, for a given symbol, the reference value of at least one subset of said pilot subcarriers, by means of a data item for correcting the phase and/or amplitude for each of said pilot subcarriers of said subset, so as to minimise the peak-to-average power ratio, said correction data taking at least three distinct values, the transition between the values of two successive pilot subcarriers of said subset on the frequency axis being constant.

The method according to an embodiment of the invention may in particular use a multiplicative and/or additive transition law.

Thus an embodiment of the invention is based on a novel and inventive approach to the transmission of a signal, aimed to improving the subcarrier reservation technique, usually referred to as the "TR technique" ("Tone Reservation"), without the addition of supplementary pilot subcarriers. For this purpose, an embodiment of the invention uses, for reducing the PAPR, pilot subcarriers moreover already dedicated to a particular function, said pilot subcarriers being modified so as to optimise this reduction in the PAPR, by means of at least three distinct correction data values. This modification is of course made so that the processing operations assisting and/or improving the decoding to which the pilot subcarriers were initially dedicated, such as channel synchronisation or estimation, are always optimal.

Pilot subcarriers thus means in particular the subcarriers belonging to the group of:
  pilot subcarriers dedicated to synchronisation;
  pilot subcarriers dedicated to channel estimation;
  signalling subcarriers, referred to as "TPS subcarriers" ("Transmission Parameters Signalling"), which are special subcarriers containing information comprising, among other things, the modulation type, the transmission mode and the coding efficiency;
  etc.

According to one embodiment of the transmission method, said subset of said pilot subcarriers comprises pilot subcarriers dedicated to channel estimation. In other words, an embodiment of the invention makes it possible to use the same (or some of the same) pilot subcarriers for reducing the PAPR and estimating the transmission channel, thus avoiding additional reservation of subcarriers other than the existing pilot subcarriers.

According to other possible embodiments, other pilot subcarriers dedicated to a function different from channel estimation may also be used.

The method according to an embodiment of the invention also proposes to determine correction data in a set of non-predefined values, calculated by an optimisation algorithm aimed at reducing the PAPR for transmitting each OFDM symbol to be transmitted and not known to the receiver.

Thus, unlike the customs of persons skilled in the art, an embodiment of the invention proposes to use at least three distinct values of data for correcting the phase and/or amplitude for each of said pilot subcarriers dedicated to channel estimation rather than pilot sequences that impose the choice of pilot subcarriers in a set of two distinct values (−1 and 1) predefined on transmission.

In other words, an embodiment of the invention aims to increase in optimum fashion the gain in reduction of the PAPR, not limited to pilot sequences of constant power.

Moreover, the method used may also not apply to all the pilot subcarriers dedicated to channel estimation, but a subset of said pilot subcarriers dedicated to channel estimation. For example, it is possible to apply a correction to a pilot subcarrier, the following two in the frequency spectrum remaining invariant.

In an embodiment, the method also comprises the following steps:
  determining said correction data, comprising at least, for a given symbol:
    a substep of calculating an initial correction parameter applied to a first pilot subcarrier dedicated to channel estimation $P_0$ on the frequency axis of said subset of said pilot subcarriers dedicated to channel estimation, and/or
    a substep of calculating a transition parameter defining the transition value of a pilot subcarrier dedicated to channel estimation $P_i$ applied to the pilot subcarrier dedicated to estimation of the following channel $P_{i+1}$ on the frequency axis of said subset of said pilot subcarriers dedicated to channel estimation,
    said initial correction parameter and said transition parameter being chosen so as to minimise the peak-to-average power ratio;
    a substep of obtaining said correction data from said initial correction parameter and said transition parameter;
  modifying the reference value of said pilot subcarriers dedicated to channel estimation according to said correction data, supplying corrected values intended to modulate said pilot subcarriers, dedicated to channel estimation, of said subset.

Advantageously, said obtaining substep determines said correction data according to said initial correction parameter for the pilot subcarrier dedicated to estimation of the channel with the lowest frequency, and according to the modification applied to the pilot subcarrier dedicated to the previous channel estimation on the frequency axis and according to the transition parameter, for the other pilot subcarriers dedicated to channel estimation.

According to a particular embodiment, said correction data, said initial correction parameter and/or said transition parameter are defined with a predetermined step and/or chosen from a set of predetermined values.

Thus, if correction data of the phase of said pilot subcarriers dedicated to channel estimation are considered, it can be envisaged that a set of discrete correction values varying for example incrementally by 5°, or that this set is chosen from a set of integer values.

According to an embodiment of the invention, said transition between two of said subcarriers uses a transition law belonging to the group comprising:
  multiplicative transition laws,
  additive transition laws.

It is also possible to use a transition law in the form of a combination of multiplicative and/or additive transition laws.

According to an embodiment, the transmitter and receiver may function with a single predetermined transition law (said additive and/or multiplicative transition law), not requiring the use of a prior step of choosing said transition law.

According to another embodiment, the invention uses, optionally, a prior step of choosing said transition law, for a given symbol or a given series of symbols.

Said prior step of choosing said transition law delivers binary choice information, and the method of an embodiment of the invention uses a step of transmitting said choice information.

More precisely, a multiplicative transition law determines the modification to be applied to said pilot subcarrier dedicated to the channel estimation $P_{i+1}$ by multiplication of a correction parameter $C_i$ applied to said previous pilot subcarrier dedicated to the channel estimation $P_i$ on the frequency axis, by said transition parameter.

In other words, according to this first approach, an embodiment of the invention uses a multiplicative transition law consisting of multiplying said initial correction parameter $C_0$ applied to the first pilot subcarrier dedicated to the channel estimation $P_0$ on the frequency axis, by a complex optimisation value $\Delta_m$ representing a variation in amplitude and/or phase, delivering a correction parameter $C_1$ applied to the second pilot subcarrier dedicated to the channel estimation $P_1$. The pilot subcarrier dedicated to the channel estimation $P_2$ being in its turn calculated by multiplication of $C_1$ by $\Delta_m$, and so on for the pilot subcarriers dedicated to the following channel estimation on the frequency axis.

Moreover, the additive transition law determines the modification to be applied to said pilot subcarrier dedicated to the channel estimation $P_{i+1}$ by addition of a correction parameter $C_i$ applied to said previous pilot subcarrier dedicated to the channel estimation $P_i$ on the frequency axis by said transition parameter.

This second approach uses an additive transition law consisting of adding said initial correction parameter $C_0$ applied to the first pilot subcarrier dedicated to the channel estimation $P_0$ on the frequency axis, to a complex optimisation value $\Delta_a$ representing an amplitude and phase variation, delivering a correction parameter $C_1$ applied to the second pilot subcarrier dedicated to the channel estimation $P_1$. The pilot subcarrier dedicated to the channel estimation $P_2$ being in its turn calculated by addition of $C_1$ and $\Delta_a$, and so on for the following pilot subcarriers on the frequency axis.

An embodiment of the invention also concerns a device for the multicarrier transmission of a signal representing a source signal, comprising symbols consisting of a set of subcarriers, intended to be sent simultaneously and comprising pilot subcarriers dedicated to at least one processing operation assisting and/or improving the decoding in at least one receiver, and data subcarriers, the location in the time-frequency space and a reference value of said pilot subcarriers being known to the receiver or receivers.

According to an embodiment of the invention, the transmission device comprises means of modifying, for a given symbol, the reference value of at least one subset of said pilot subcarriers, using a data item for correcting the phase and/or amplitude for each of said pilot subcarriers of said subset, so as to minimise the peak-to-average power ratio, said correction data taking at least three distinct values, the transition between the values of two successive pilot subcarriers of said subset on the frequency axis being constant.

The transmission device according to an embodiment of the invention can in particular use a multiplicative and/or additive transition law.

Such a transmission device is in particular able to implement the transmission method according to an embodiment of the invention as described previously.

An embodiment of the invention also concerns a multicarrier signal obtained by the method according to an embodiment of the invention comprising symbols consisting of a set of subcarriers, intended to be sent simultaneously and comprising pilot subcarriers dedicated to at least one processing operation assisting and/or improving the decoding in at least one receiver and data subcarriers, the location in the time-frequency space and a reference value of said pilot subcarriers being known to the receiver or receivers.

According to an embodiment of the invention, such a signal is such that, for a given symbol, the reference value of at least one subset of pilot subcarriers is modified, by means of a parameter for correcting the phase and/or amplitude of each of said pilot subcarriers of said subset, so as to minimise the peak-to-average power ratio, said correction parameters taking at least three distinct values, the transition between the values of two successive pilot subcarriers of said subset on the frequency axis being constant.

The obtaining of the signal according to an embodiment of the invention may in particular use a multiplicative and/or additive transition law.

According to an embodiment, the transmitter and receiver may function with a single predetermined transition law (additive or multiplicative for all the symbols) not requiring the transmission of additional information.

According to another embodiment, such a signal comprises, optionally, at least one item of information assisting reception, from the information belonging to the group comprising:
- information representing said initial correction parameter;
- information representing said transition parameter;
- binary information representing the choice of a transition law between two of said pilot subcarriers dedicated to the channel estimation of said subset.

Thus, according to this particular embodiment, the signal may for example comprise solely said binary information representing the choice of a transition law between two of said pilot subcarriers dedicated to the channel estimation of said subset, if a "blind" estimation on reception is in particular sought. The receiver determines, without any additional information transmitted, the correction data for the pilot carriers.

According to a different embodiment, a single predetermined transition law can be considered within the transmitter and the receiver, not requiring any transmission of binary information representing the choice of a transition law between two of said pilot subcarriers dedicated to the channel estimation of said subset, and a transition parameter fixed on transmission. Two variants of this embodiment are possible, one using a receiver intrinsically knowing the value of said transition parameter, the other using the transmission of a signal containing information representing said transition parameter.

Similarly, another embodiment may consist of considering a fixed initial correction parameter and a single predetermined transition law within the transmitter and the receiver, and can be implemented in the form of two variants using or not the transmission of information representing said initial correction parameter.

Numerous other embodiments, combining different embodiments previously cited, can also be used according to the method of the invention.

An embodiment of the invention also concerns a computer program product downloadable from a communication network and/or recorded on a medium that can be read by computer and/or is executable by a processor. According to an embodiment of the invention, said computer program product comprises program code instructions for implementing the transmission method described above, when it is executed on a computer.

An embodiment of the invention also concerns a method of receiving a signal described previously, sent by at least one transmitter via a transmission channel, said signal being formed from a temporal succession of symbols consisting of a set of subcarriers, intended to be sent simultaneously and comprising pilot subcarriers dedicated to at least one processing operation for assisting and/or improving the decoding in at least one receiver and data subcarriers, the location in time-frequency space and a reference value of said pilot subcarriers being known to the receiver or receivers, the reference value of at least one subset of said pilot subcarriers being modified, for a given symbol, by means of a parameter for correcting the phase and/or amplitude of each of said pilot subcarriers of said subset, so as to minimise the peak-to-average power ratio, said correction parameters taking at least three distinct values, the transition between the values of two successive pilot subcarriers in said subset on the frequency axis being constant.

The reception method according to an embodiment of the invention can in particular use a multiplicative and/or additive transition law.

According to an embodiment of the invention, the reception method uses the following steps:
extraction of the information received modulating each of the subcarriers of said subset of carriers;
analysing all said received information, so as to determine an estimation of said correction data;
estimating the transmission channel from said correction data.

Thus an embodiment of the invention allows, on reception, a so-called "blind" estimation, not requiring the transmission of additional information according to an embodiment of the invention. An embodiment of the invention thus avoids a reduction in the spectral efficiency due to the "reservation" of subcarriers solely dedicated to the reduction of the PAPR.

According to one from all the variant embodiments previously described, the invention allows, on reception, a so-called "blind" estimation not requiring the transmission of additional information apart from the binary information representing the choice of a transition law between two of said pilot subcarriers of said subset.

Optionally, the reception method, according to a particular embodiment, uses, following said steps of extracting, analysing, modifying and estimating the channel, the following step:
evaluating the error in estimating the modification applied to said subset of said pilot subcarriers using a calculation of the mean square error.

This particular embodiment makes it possible essentially to evaluate the performances of the method in reception. Moreover, it is possible to consider the transmission of a so-called "null" symbol, in order to evaluate the exact value of the frequency response of the channel, and to integrate the estimation error for the channel estimation of the following symbol.

In an embodiment, said analysis step comprises:
a step of determining a transition parameter defining the transition value from a pilot subcarrier dedicated to the channel estimation $P_i$ to the pilot subcarrier dedicated to the following channel estimation $P_{i+1}$ on the frequency axis of said subset of said pilot subcarriers dedicated to the channel estimation, by analysing all the transitions; and/or
a step of determining an initial correction parameter $C_0$ applied to the first pilot subcarrier dedicated to the channel estimation $P_0$ on the frequency axis of said subset of said pilot subcarriers, according to the value of at least one of said pilot subcarriers of said subset of said pilot subcarriers dedicated to the channel estimation and the transition parameter;
a step of determining the correction parameters applied to all the other pilot subcarriers $P_{i,i\neq 0}$ dedicated to the channel estimation on the frequency axis of said subset of said pilot subcarriers dedicated to the channel estimation, according to the value of the initial correction parameter $C_0$ applied to the first pilot subcarrier dedicated to the channel estimation $P_0$ and that of the transition parameter.

In addition, at least one of said determination steps uses averaging.

According to a particular embodiment of the reception method, such as for at least one of said determination steps, said initial correction parameter and/or said transition parameter is defined with a predetermined step and/or one chosen from a set of predetermined values.

Thus, advantageously, analysis of all of said information received would be simplified and accelerated by determining for example correction data for the phase of said pilot subcarriers dedicated to the channel estimation, envisaging a set of discrete correction values varying incrementally by 5°, or a set chosen from a set of integer values.

According to an embodiment, the transmission and receiver can function with a single predetermined transition law (additive or multiplicative for all the symbols), not requiring the transmission of additional information.

According to a particular embodiment, the reception method comprises a prior step of decoding at least one of the items of information belonging to the group comprising:
information representing said initial correction parameter;
information representing said transition parameter;
binary information representing the choice of a transition law between two of said pilot subcarriers of said subset.

An embodiment of the invention also concerns a device for receiving a signal transmitted according to the transmission method of an embodiment of the invention, sent by at least one transmitter via a transmission channel, said signal being formed by a temporal succession of symbols consisting of a set of subcarriers, intended to be sent simultaneously and comprising pilot subcarriers dedicated to at least one processing operation assisting and/or improving the decoding in at least one receiver, and data subcarriers, the location in time-frequency space and a reference value of said pilot subcarriers being known to the receiver or receivers, the reference value of at least one subset of said pilot subcarriers being modified, for a given symbol, by means of a parameter correcting the phase and/or amplitude of each of said pilot subcarriers of said subset, so as to minimise the peak-to-average power ratio, said correction parameters taking at least three distinct values, the transition between the values of two successive pilot subcarriers of said subset on the frequency axis being constant.

This device comprises:
- means of extracting the received information modulating each of the subcarriers of said subset of carriers;
- means of analysing all said information received, so as to determine an estimation of said correction data;
- means of estimating the transmission channel from said correction data.

The reception device according to an embodiment of the invention can in particular use a multiplicative and/or additive transition law.

An embodiment of the invention also concerns a computer program product downloadable from a communication network and/or recorded on a medium that can be read by computer and/or is executable by a processor. According to an embodiment of the invention, said computer program product comprises program code instructions for implementing the reception method according to an embodiment of the invention, when it is executed on a computer.

BRIEF DESCRIPTION OF THE DRAWINGS

Other features and advantages will emerge more clearly from a reading of the following description of a particular embodiment, given by way of simple illustrative and non-limitative example, and the accompanying drawings, among which:

FIG. 3 illustrates the signal according to an embodiment of the invention;

DETAILED DESCRIPTION OF ILLUSTRATIVE EMBODIMENTS

1. General Principle

Figure 1:
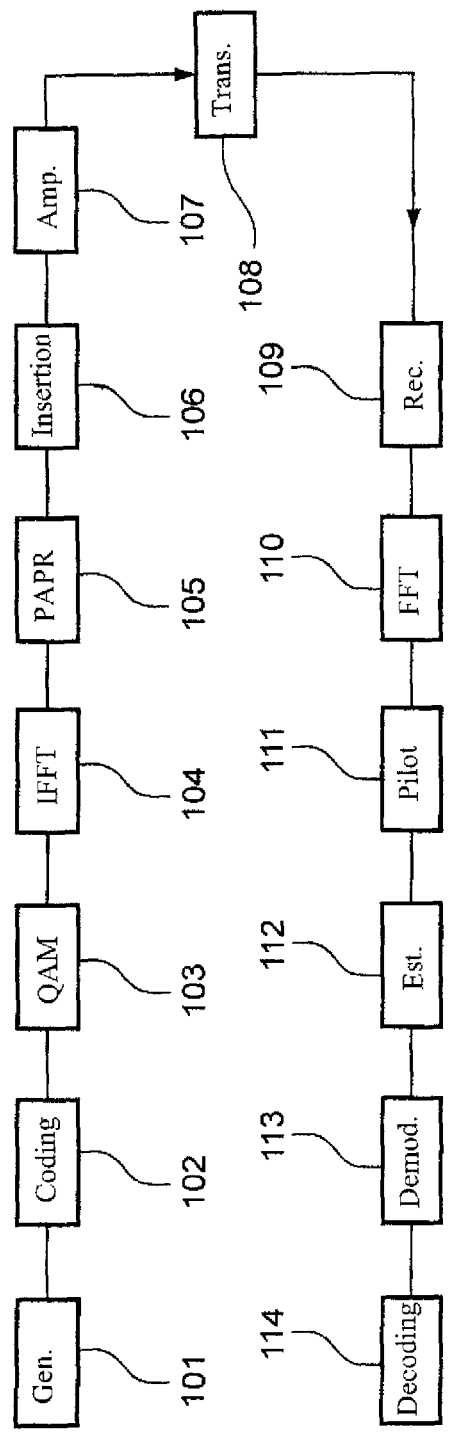
FIG. 1 illustrates the general OFDM signal processing diagram.

An embodiment of the invention is therefore based on the use of at least three distinct values of data for correcting pilot subcarriers so as to reduce optimally the peak-to-average power ratio, or PAPR, said pilot subcarriers already being dedicated to another function, such as channel estimation. Moreover, the corresponding reception method makes it possible in particular to estimate said channel "blind".

The general OFDM signal processing diagram aimed at reducing the PAPR is described below in relation to FIG. 1. An OFDM signal is, according to the embodiment as described by the general diagram in relation to FIG. 1, processed in a succession of steps:

on transmission:
- generation 101 of source data;
- coding and interleaving 102 of said data delivering interleaved data;
- modulation of said interleaved data 103 for example according to a QAM modulation;
- OFDM modulation 104 using in particular an inverse fast Fourier transform (IFFT) delivering OFDM symbols;
- correction 105 of the OFDM symbols aimed at reducing the PAPR;
- insertion 106 of a guard time in said OFDM signal consisting of said symbols;
- amplification 107 of said OFDM signal;
- transmission 108 of said OFDM signal on a transmission channel;

and on reception:
- reception 109 and extraction of the guard time delivering a so-called received signal;
- OFDM demodulation 110 of said received signal using a fast Fourier transform (FFT) delivering a transformed received signal;
- determination 111 of the pilot carriers of said transformed received signal;
- channel estimation 112;
- demodulation 113 of said transformed received signal delivering a demodulated signal;
- de-interleaving and decoding 114 of said demodulated signal.

More precisely, use is made, according to a particular embodiment adapted for example to a European terrestrial digital television system DVB-T, in the case where each OFDM symbol is composed of N=2048 subcarriers (2K mode). All these 2048 carriers constituting the OFDM symbol comprise so-called "unused" subcarriers complying with a mask according to a transmission and useful subcarriers such that the number of useful subcarriers is N=1705, the useful subcarriers referring to the data subcarriers and to the pilot subcarriers. Each of the pilot subcarriers reserved for the reduction of the PAPR will have a maximum power such that it is equal to 10 times the power of a data subcarrier ($\Gamma_{max}$=10 dB+$\Gamma_0$ where $\Gamma_0$ corresponds to the power of a data subcarrier). The location in the time-frequency space and a reference value of said pilot subcarriers are known and particular to the application sought, for example, illustratively and non-limitatively, the 2K mode of the DVB-T standard.

Moreover, a 16-QAM quadrature amplitude modulation is used for the information data. An oversampling factor L=4 is applied. In addition a non-linear amplifier of the SSPA (Solid State Power Amplifier) type may for example be considered using the Rapp model.

The complex symbols $X=[X_0 \ldots X_{N-1}]_{1 \times N}^T$ representing the sent information data can for example be defined. The inverse Fourier transforms thereof are denoted $x=[x_0 \ldots x_{N-1}]_{1 \times N}^T$. The equivalent OFDM signal in base band is written:

$$x(t) = \frac{1}{\sqrt{N}} \sum_{k=0}^{N-1} X_k e^{\frac{j2\pi kt}{TN}} \quad 0 \leq t < NT, \quad (1)$$

where $j=\sqrt{-1}$, N represents a number of orthogonal carriers and T is the duration of the complex symbol. In practice, only NL equidistant samples of x(t) are considered, with L the oversampling factor as described above. The oversampled signal is represented by:

$$x_n(t) = \frac{1}{\sqrt{NL}} \sum_{k=0}^{N-1} X_k e^{\frac{j2\pi nk}{NL}}, \forall n \in [0, \ldots, NL-1] \quad (2)$$

For a sufficiently large value of L the PAPR of an OFDM signal is given by the following equation:

$$PAPR\{x(t)\} \approx PAPR\{x_L, L \geq 4\} = \frac{\max_{0 \leq n \leq NL-1} |x_n|^2}{E\{|X_L|^2\}} \quad (3)$$

with $x_L = Q_L X_L$, \hfill (4)

where E{·} designates the expected value, $$X_L = \left[X_0 \ldots X_{\frac{N}{2}-1} \underbrace{0 \ldots \ldots 0}_{L} X_{\frac{N}{2}} \ldots X_{N-1}\right]^T_{1 \times NL} \quad (5)$$

and $Q_L$ is the inverse discrete Fourier transform (IFFT) matrix defined by the equation:

$$Q_L = \frac{1}{\sqrt{N}} \begin{bmatrix} 1 & 1 & \vdots & 1 \\ 1 & e^{\frac{j2\pi}{NL}1\cdot 1} & \vdots & e^{\frac{j2\pi}{NL}1\cdot(NL-1)} \\ \vdots & \vdots & \vdots & \vdots \\ 1 & e^{\frac{j2\pi}{NL}(NL-1)\cdot 1} & \vdots & e^{\frac{j2\pi}{NL}(NL-1)(NL-1)} \end{bmatrix}_{NL \times NL} \quad (5)$$

The main steps of the transmission method according to an embodiment of the invention are presented in relation to FIG. 2.

The transmission method used by an embodiment of the invention aims to reduce the PAPR and uses a novel and inventive approach of step 105 in relation to FIG. 1.

Its principle consists of adding to the original time signal x, a correction signal c making it possible to reduce its PAPR. Thus the resulting signal satisfies the relationship PAPR(x+c)<PAPR(x). It can be written as follows:

$$x_n + c_n = \frac{1}{\sqrt{NL}} \sum_{k=0}^{N-1} (X_k + C_k) e^{j\frac{2\pi nk}{NL}} \quad \forall n \in [0, \ldots, NL-1] \quad (6)$$

The signal c is calculated on the basis of the characteristics of the signal x and using an optimisation technique.

Thus the correction technique according to an embodiment of the invention uses a step 20 of modifying, for a given symbol, the reference value of at least one subset of the pilot subcarriers, said subset corresponding in the case of the DVB-T standard to a subset of pilot subcarriers dedicated to channel estimation, by means of a data item c for correcting the phase and/or amplitude for each of the pilot subcarriers of said subset so as to minimise the PAPR.

Figure 2A:
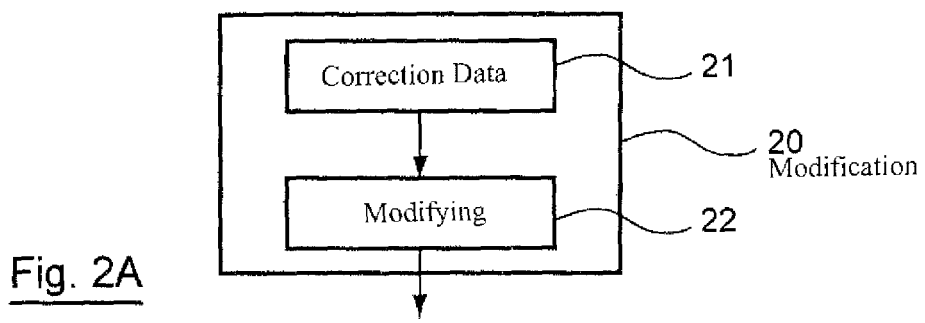
FIG. 2 illustrates the main steps of a transmission method according to an embodiment of the invention.

In relation to FIG. 2A, this modification step 20 is composed of a step 21 of determining the correction data and a step 22 of modifying the reference value of the pilot subcarriers of said subset.

Let R={0, ..., N−1} be the set of indices of all the carriers (data carriers and pilot carriers), $R_d$={0, ..., $N_d$−1}⊂R the set of data carriers and $R_p$={0, ..., $N_p$−1}⊂R the set of the pilot subcarriers. This therefore gives N=$N_d$+$N_p$.

In addition, the subset of the pilot subcarriers dedicated simultaneously to reduction of the PAPR and channel estimation is defined by the indices of $R_r$ such that $R_r$={0, ..., $N_r$−1}⊂$R_p$.

Step 21 consists of minimising the PAPR(x+c) under the constraint that the time signal c or the frequency information C is optimised so as to be able to be detected "blind" on reception. More precisely, this step consists of solving the following convex optimisation problem:

$$\text{Minimise } \beta \quad (7)$$
$$\text{subject to the constraint } \|x_n + q_{n,L}^{row}C\| \leq \beta, \, 0 \leq n \leq NL-1$$
$$\|C_k\| \leq \sqrt{\Gamma_{max}}, \, k \in R_r$$
$$C_{k+1} = f(C_k), \, k \in R_r,$$

where the function f(·) defines a deterministic law, and $\Gamma_{max}$=10 dB.

According to one embodiment, the optimisation technique uses a convex optimisation algorithm of the SOCP ("Second Order Cone Programming") type. The Yalmip and Tomlab simulation tools are for example (non-limitatively), tools that can be used under the Matlab software (registered trade mark).

This algorithm uses the following substeps:
- a substep of calculating an initial correction parameter $C_0$ applied to the first pilot subcarrier dedicated to channel estimation $P_0$ of $N_r$ on the frequency axis of said subset of said pilot subcarriers dedicated to channel estimation, and/or
- a substep of calculating a transition parameter Δ, defining the transition value of a pilot subcarrier dedicated to channel estimation $P_i$ to the pilot subcarrier dedicated to the following channel estimation $P_{i+1}$ on the frequency axis of said subset of said pilot subcarriers dedicated to the channel estimation, said initial correction parameter $C_0$ and said transition parameter Δ being chosen so as to minimise the PAPR,
- a substep of obtaining said correction data, all the $C_k$, from said initial correction parameter $C_0$ and said transition parameter Δ, so that said correction data take at least three distinct values, the transition Δ between the values of two pilot subcarriers dedicated to channel estimation that are successive on the frequency axis being constant.

The modification of the pilot carriers aimed at reducing the PAPR is then carried out (22) and consists of allocating, to the pilot carriers of said subset of said pilot subcarriers dedicated to channel estimation, the correction data that can reduce the PAPR. The operation takes place in the form of signal addition in the time domain.

Figure 2B:
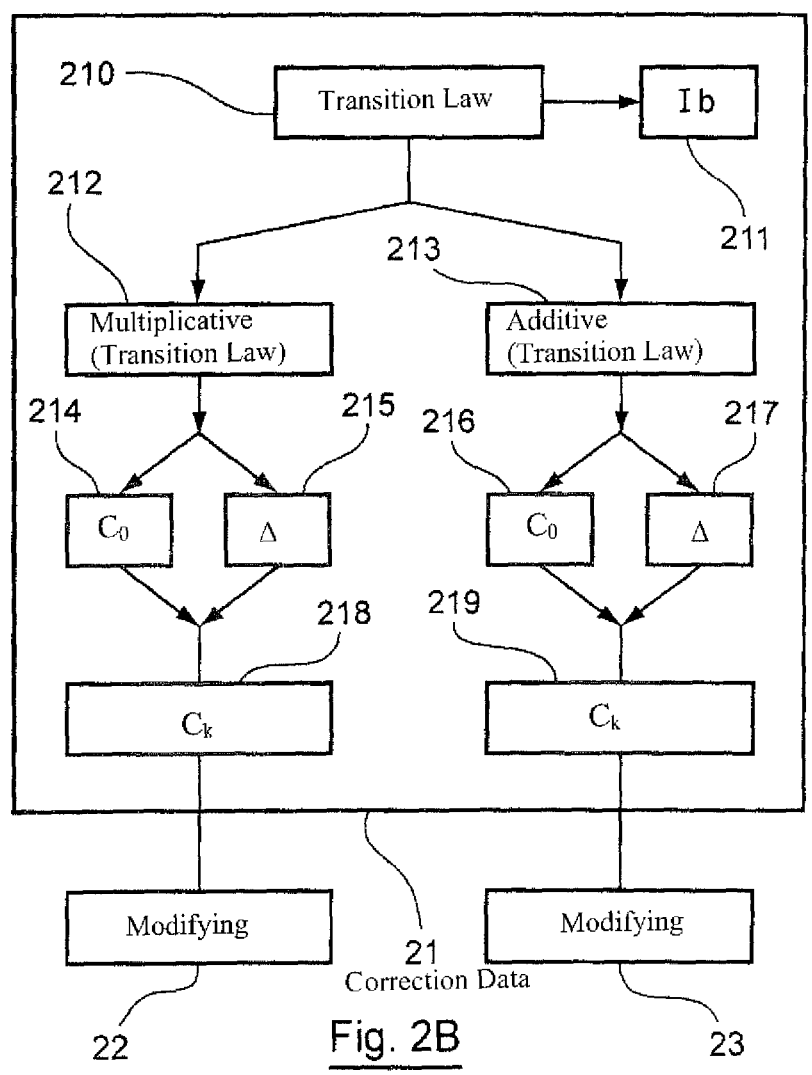

FIG. 2B describes the implementation of step 21 according to two particular independent embodiments.

Indeed, the transition between two of said pilot subcarriers dedicated to channel estimation that are successive on the frequency axis is constant and uses the function f(·) defining a deterministic transition law belonging to the group comprising:
- multiplicative transition laws,
- additive transition laws.

It is also possible to use a transition law in the form of a combination of multiplicative and/or additive transition laws.

A step 210 is first implemented, determining said transition law applied for a data symbol or a series of data symbols.

According to an embodiment, the transmitter and receiver can function with a single predetermined transition law (additive or multiplicative for all the symbols), not requiring the transmission of additional information.

Step 210 optionally delivers 211 binary choice information Ib that can be transmitted within the signal, according to the particular embodiment shown in FIG. 2B.

2. Description of a Particular Embodiment Using a Multiplicative Transition Law

A particular embodiment of the invention using a multiplicative transition law is described below. According to this embodiment, the function f(·) (equation (7)), defines a relationship between the correction data $C_k$ applied to the pilot subcarriers dedicated to channel estimation, such that:

$$C_{k+1} = C_k \times \Delta, k \in R_r \qquad (8)$$

The optimisation problem represented by equation (7) then becomes:

Minimise $\beta$ (9)

under constraint $\|x_n + q_{n,L}^{row} C\| \leq \beta, 0 \leq n \leq NL - 1$ $\|C_k\| \leq \sqrt{\Gamma_{max}}, k \in R_r$ $C_{k+1} = C_k \times \Delta, k \in R_r,$ Thus, in relation to FIG. 2B, once the choice 210 of the multiplicative transition law has been made, the optimisation algorithm is used (212).

The algorithm calculates and delivers 214 the initial correction parameter $C_0$ applied to the first pilot subcarrier dedicated to the channel estimation $P_0$ of $N_r$ on the frequency axis of said subset of said pilot subcarriers dedicated to channel estimation on the one hand, and calculates and delivers 215 the transition parameter $\Delta$, defining the transition value of a pilot subcarrier dedicated to the channel estimation $P_1$ to the pilot subcarrier dedicated to the following channel estimation $P_{i+1}$ on the frequency axis of said subset of said pilot subcarriers dedicated to channel estimation on the other hand.

Once these two correction parameters have been obtained, all the $C_k$ are calculated 218, which marks the end of the correction parameter determination step 21.

The pilot carriers dedicated to channel estimation aimed at reducing the PAPR are then modified (22).

The transition variable $\Delta$ is constant for a given OFDM symbol and may represent a variation belonging to the group:
amplitude variation;
phase variation;
phase and amplitude variation.

3. Description of a Particular Embodiment Using an Additive Transition Law

A particular embodiment of the invention using an additive transition law is described below. According to this embodiment, the function f(·) (equation (7)), defines a relationship between the correction data $C_k$ applied to the pilot subcarriers dedicated to the channel estimation, such that:

$$C_{k+1} = C_k + \Delta, k \in R_r \qquad (8 \text{ bis})$$

The optimisation problem represented by equation (7) then becomes:

Minimise $\beta$ (9 bis)

under constraint $\|x_n + q_{n,L}^{row} C\| \leq \beta, 0 \leq n \leq NL - 1$ $\|C_k\| \leq \sqrt{\Gamma}, k \in R_r$ $C_{k+1} = C_k \times \Delta, k \in R_r,$ Thus, in relation to FIG. 2B, once the choice 210 of the additive transition law has been made, the optimisation algorithm is used (213).

The algorithm calculates and delivers 216 the initial parameter $C_0$ applied to first pilot subcarrier dedicated to the channel estimation $P_0$ of $N_r$ on the frequency axis of said subset of said pilot subcarriers dedicated to channel estimation on the one hand, and calculates and delivers 217 the transition parameter $\Delta$, defining the transition value of a pilot subcarrier dedicated to channel estimation $P_i$ to the pilot subcarrier dedicated to the following channel estimation $P_{i+1}$ on the frequency axis of said subset of said pilot subcarriers dedicated to channel estimation on the other hand.

Once these two correction parameters have been obtained, all the $C_k$ are calculated 219, which marks the end of the correction parameter determination step 21.

The pilot carriers dedicated to channel estimation aimed at reducing the PAPR are then modified (23).

4. Description of Other Variant Embodiments of the Transmission Method

Other variants can be used, for example it can be considered that one of the correction parameters ($C_0$ or $\Delta$) is fixed before launching the optimisation algorithm.

Moreover, it is also possible to use a transition law in the form of a combination of multiplicative and/or additive transition laws.

Moreover, another variant consists of imposing an additional constraint to the optimisation problem so that said correction data, said initial correction parameter and/or said transition parameter are defined with a predetermined step and/or one chosen from a set of predetermined values.

For example, if correction data for the phase of said pilot subcarriers dedicated to channel estimation are considered, it is possible to envisage a set of discrete correction values varying incrementally by 5°, or that this set can be chosen from a set of integer values.

Annex A, which forms an integral part of the present description, proposes a practical example of an embodiment of the invention according to which an additive or multiplicative transition law is chosen, and one of the correction parameters is fixed or not. In each of the cases illustrated, at least three distinct values of $C_k$ are obtained.

5. Description of the Signal According to an Embodiment of the Invention

FIG. 3 illustrates an example of a frame 30 of the multicarrier signal transmitted according to a particular embodiment of the invention. Such a frame comprises one or more headers 31 containing information known to the receiver and transmitter (for example of a size equivalent to two symbols) and multicarrier symbols 33. These useful symbols 33 are each preceded by a guard time 32.

Thus:
at a time t, the first symbol of the header 31 is sent, then
at a time $t+T_0$, the second symbol of the header 31 is sent, then
at a time $t+2T_0$, the first useful symbol 33 accompanied by the guard time 32 is sent, then
at a time $t+3T_0$, the second useful symbol 33 accompanied by guard time 32 is sent,
etc,
with $T_0$ the duration of a multicarrier symbol at the output of the modulator.

Moreover, each multicarrier symbol 33 is composed of a set of subcarriers, all the useful subcarriers being composed of the data subcarriers 35 and pilot subcarriers 36.

According to an embodiment not shown in FIG. 3, the transmitter and receiver can function with a single predetermined transition law (additive or multiplicative for all the symbols), not requiring the transmission of additional information within the signal.

In addition, according to a particular embodiment of the invention, the OFDM symbol detailed in FIG. 3 may optionally contain binary information 34 on the choice of the transition law chosen on transmission.

Moreover, according to variant embodiments not shown, the signal may also contain at least one item of information belonging to the group comprising:
- information representing said initial correction parameter;
- information representing said transition parameter;
- binary information representing the choice of a transition law between two of said pilot subcarriers dedicated to the channel estimation of said subset.

For example, if the second case of annex A is considered, which uses a multiplicative transition law, the transmission of signal containing for a given symbol $\Delta$ and the binary information representing the choice of a transition law between two of said pilot subcarriers of said subset may optionally be envisaged in order to accelerate the processing on reception.

However, an embodiment of the invention uses a reception method capable of executing a so-called "blind" estimation of the correction data allocated to the pilots dedicated to the channel estimation.

Figure 4:
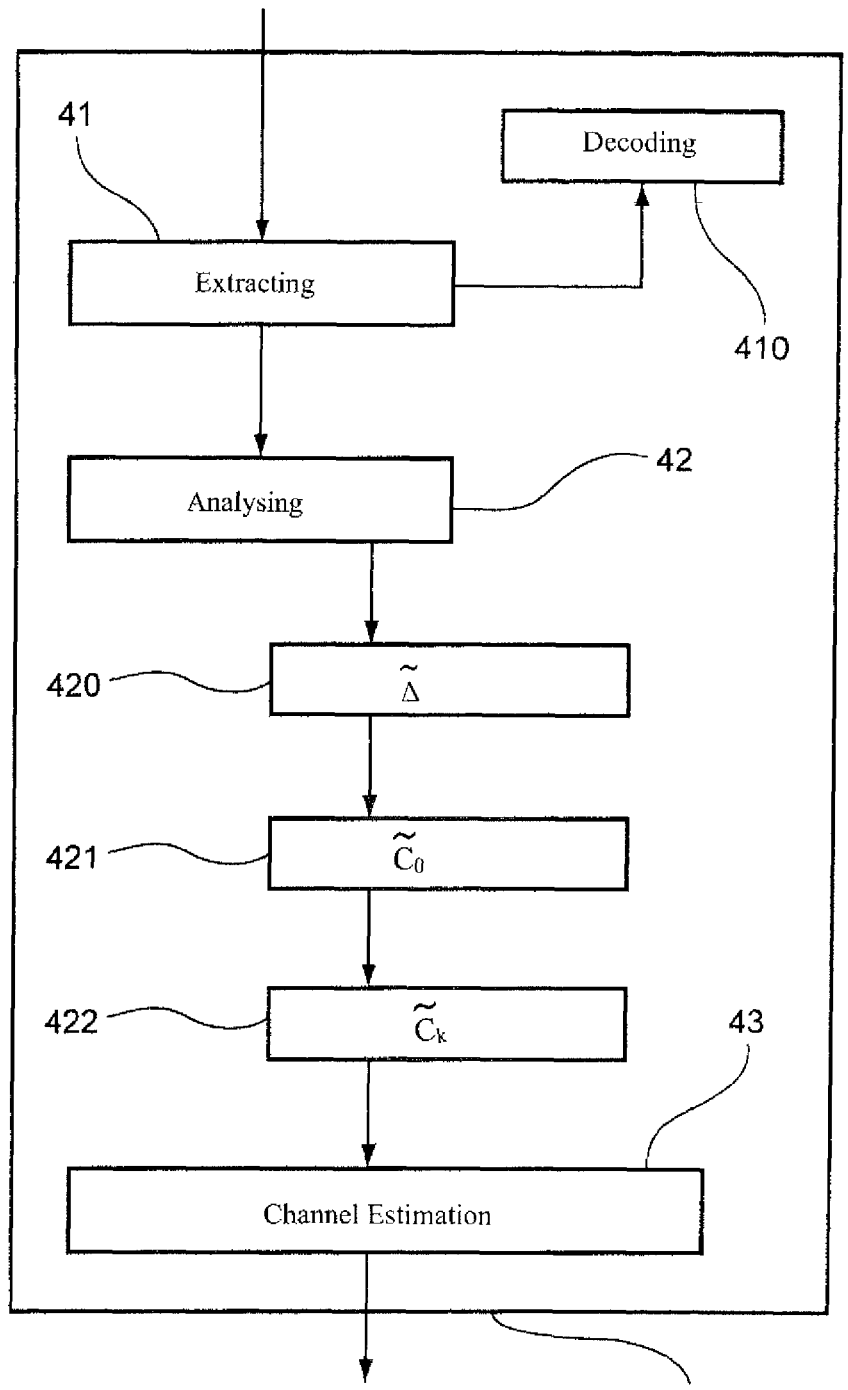
FIG. 4 illustrates the main steps of a reception method according to an embodiment of the invention.

6. Description of the Reception Method According to an Embodiment of the Invention FIG. 4 illustrates the main steps of the method of receiving a multicarrier signal formed by a temporal succession of multicarrier symbols.

During a first step 41, the information modulating each of the subcarriers is extracted after an FFT and can be expressed by the following equation:

$$Y = \sum_{k \in R_d} H_k X_k + \sum_{k \in R_p | k \notin R_r} H_k Z_k + \sum_{k \in R_r} H_k C_k + \sum_{k \in R} W_k \qquad (10)$$

where the $(H_k)_{k=0,\ldots,N-1}$ represent the frequency coefficients of the transmission channel and the $(W_k)_{k=0,\ldots,N-1}$ designate the components of the additive white Gaussian noise (AWGN), and $(Z_k)_{k \in R_p | k \notin R_r}$ the pilot subcarriers not modified on transmission.

By extracting the carriers reserved for the reduction of the PAPR, which are also the pilot carriers dedicated to a channel estimation function for example, the following components of the vectors Y are obtained:

$$Y_k = \sum_{k \in R_r} H_k C_k + W_k \qquad (11)$$

According to an embodiment, the transmitter and receiver can function with a single predetermined transition law (additive or multiplicative for all the symbols), then not requiring the existence of the binary information representing the choice of a transition law.

According to another embodiment, an optional step 410 of decoding at least one item of binary information representing the choice of a transition law is performed.

Next, during a step 42 of analysing all the information received, an estimation of the correction data applied on transmission is determined.

In order to estimate this constraint, a calculation is performed for example according to the following equation applied to a multiplicative transition law:

$$\sum_{k \in R_r} \frac{Y_{K+1}}{Y_k} = \qquad (12)$$

$$\frac{H_1 f(C_0)}{H_0 C_0 + W_0} + \frac{H_2 f(C_1)}{H_1 C_1 + W_1} + \ldots + \frac{H_{N_{r-1}} f(C_{N_{r-2}})}{H_{N_{r-2}} C_{N_{r-2}} + W_{N_{r-2}}} + \sum_k \tilde{W}_k$$

where the $(\tilde{W}_k)$ are noise components and subsequently the transition parameter is also denoted $$\Delta = \frac{f(C_k)}{C_k}.$$

The estimated value of $\Delta$ is denoted $\tilde{\Delta}$, such that:

$$\tilde{\Delta} = \Delta + \in \qquad (13)$$

where $\in$ represents the error in estimating $\Delta$. Equation (12) can then be rewritten in the form:

$$\sum_{k \in R_r} \frac{Y_{k+1}}{Y_k} = \frac{H_1}{H_0} \tilde{\Delta}_0 + \frac{H_2}{H_1} \tilde{\Delta}_1 + \ldots + \frac{H_{N_{r-1}}}{H_{N_{r-2}}} \tilde{\Delta}_{N_{r-2}} + \sum_k \tilde{W}_k \qquad (14)$$

An estimated value of $\Delta$ can be deduced therefrom by calculating the mean (420) as follows:

$$\frac{1}{N_r - 1} \sum_{k \in R_r} \frac{Y_{k+1}}{Y_k} = \tilde{\Delta} \left( \frac{1}{N_r - 1} \sum_{k \in R_r} \frac{H_{k+1}}{H_k} \right) + \frac{1}{N_r - 1} \sum_k \tilde{W}_k \qquad (15)$$

Once $\Delta$ is estimated, the components $C_k$ can in their turn be estimated (421 and 422), using the following equations:

$$(\tilde{C}_k)_{k=0} = \frac{\sum_{k \in R_r} Y_k}{1 + \tilde{\Delta} + \tilde{\Delta}^2 + \ldots + \tilde{\Delta}^{N_r - 1}} \qquad (16)$$

$$(\tilde{C}_k)_{k \in R_r, k \neq 0} = \tilde{C}_{k-1} \tilde{\Delta} \qquad (17)$$

The initial correction parameter $\tilde{C}_o$ applied to the first pilot subcarrier is obtained according to step 421 using equation (16). From $\tilde{C}_o$ and $\tilde{\Delta}$, the set of correction parameters applied to all the other pilot subcarriers $(\tilde{C}_k)_{k \in R_r, k \neq 0}$ is next obtained according to step 422, using equation (17).

To estimate this constraint, a calculation can also be made according to the following equation applied to an additive transition law:

$$\sum_{k \in R_r} (Y_{k+1} - Y_k) = (C_1 - C_0) + \ldots + (C_{N_r-1} - C_{N_r-2}) + \qquad (12\text{ bis})$$

$$(W_1 - W_0) + \ldots + (W_{N_r-1} - W_{N_r-2})$$

$$= (N_r - 1)\Delta + \sum_k \tilde{W}_k$$

where the $(\tilde{W}_k)$ are noise components.

The estimated value of $\Delta$ is also denoted $\tilde{\Delta}$, such that:

$$\tilde{\Delta} = \Delta + \in \quad \text{(13 bis)}$$

where $\in$ represents the estimation error of $\Delta$. An estimated value of $\Delta$ can also be deduced from this by calculating the mean (420), equation (12 bis) can then be rewritten in the form:

$$\Delta \approx \tilde{\Delta} = \frac{1}{N_r - 1}\left(\sum_{k \in R_r}(Y_{k+1} - Y_k)\right) \quad \text{(15 bis)}$$

This equation can be written if the average of the components of the noise tends towards zero, that is to say if:

$$\frac{1}{N_r - 1}\left(\sum_k \tilde{W}_k\right) \approx 0.$$

Once $\Delta$ has been estimated, the components $C_k$ can in their turn be estimated (421 and 422), using the following equations:

$$\tilde{C}_0 = \frac{\left(\sum_{k \in R_r} Y_k\right) - \tilde{\Delta}\sum_{k=1}^{N_r-1} k}{N_r} \quad \text{(16 bis)}$$

$$\tilde{C}_k = \tilde{C}_{k-1} + \tilde{\Delta} \,\forall\, k \in R_r, k \neq 0 \quad \text{(17 bis)}$$

The initial correction parameter $\tilde{C}_0$ applied to the first pilot subcarrier is obtained according to step 421 using equation (16 bis). From $\tilde{C}_0$ and $\tilde{\Delta}$, the set of correction parameters applied to all the other pilot subcarriers $$(\tilde{C}_k)_{k \in R_r, k \neq 0}$$

is then obtained according to step 442 using equation (17 bis). Once these parameters have been obtained, a channel estimation technique 43 can be applied using the $$(\tilde{C}_k)_{k \in R_r, k \neq 0}$$

and equation (1).

Optionally, not shown, the reception method, according to a particular embodiment, uses, following said steps of extraction, analysis, modification and channel estimation, a step of evaluating the estimation error of the modification applied to said subset of said pilot subcarriers using a mean square error calculation.

This particular embodiment makes it possible essentially to evaluate the performance of the method in reception. In addition, the transmission of a so-called "null" symbol can be considered, in order to evaluate the exact value of the frequency response of the channel, and to integrate the estimation error for the channel estimation of the following symbol.

Annex A, which forms an integral part of the present description, proposes a practical example of an embodiment of the invention according to which an additive or multiplicative transition law is chosen, and one of the correction parameters is fixed or not. This annex also illustrates the steps and the results obtained on reception.

Numerous other embodiments, combining various embodiments previously cited, can also be implemented according to the method of the invention.

7. Annex A

Practical Example Embodiments $1^{st}$ case: choice of an additive transition law: it is considered that $\Delta$ and the $C_k$ are all optimisation variables.

$2^{nd}$ case: choice of a multiplicative transition law: it is considered that $\Delta$ is fixed and equal to $e^{j2\pi/(2*Nb_p)}$ where $Nb_p$ is the number of pilot characters dedicated to the reduction of the PAPR and dedicated to the channel estimation (here for example 8) and only the $C_k$ are optimisation variables.

7.1 $1^{st}$ Case: the Additive Transition Law Used for Two Multicarrier Symbols (OFDM)

7.1.1 Simulation Parameters

| AWGN-type channel (with Gaussian noise channel) | |
|---|---|
| Modulation: | 16QAM |
| L: | 4 |
| FFT mode: | 2k |
| Guard time: | ¼ |
| Number of data subcarriers: | 1512 |
| $\Gamma_{max}$: | 10 dB |
| Amplifier model: SSPA | p = 100, IBO = 8.50 dB |
| Signal to noise ratio Eb/N0; | 7 dB |

7.1.2 Symbol 1
7.1.2.1 On Transmission
Index of 8 pilot subcarriers dedicated to reduction of the PAPR:

| 828 | 840 | 852 | 864 | 876 | 900 | 912 | 924 |

Value of the correction data $C_k$ obtained for each pilot subcarrier dedicated to the channel estimation=
−1.0924−2.6039i
−0.6897−1.5143i
−0.2870−0.4248i
0.1157+0.6648i
0.5184+1.7544i
0.9211+2.8440i
1.3237+3.9336i
1.7264+5.0232i
$\Delta$=0.4027+1.0896i
PAPR of the signal before correction=9.9245 dB
PAPR of the signal after correction according to the method of the invention=8.6922 dB.
7.1.2.2 On Reception,
$\tilde{\Delta}$=0.4088+1.1122i
$\tilde{C}_k$=
−1.1165−2.7549i
−0.7076−1.6427i
−0.2988−0.5305i
0.1100+0.5817i
0.5189+1.6939i
0.9277+2.8061i
1.3365+3.9183i
1.7454+5.0304i
$\in$ (estimation error of $\Delta$ such that $\in = \Delta - \tilde{\Delta}$)=−0.0061−0.0226i
$|\in|^2$ (mean square error)=5.4797e−004

7.1.3 Symbol 2
7.1.3.1 On Transmission,
Index of 8 pilot subcarriers dedicated to reduction of the PAPR:

| 828 | 840 | 852 | 864 | 876 | 900 | 912 | 924 |
|-----|-----|-----|-----|-----|-----|-----|-----|

Value of the correction data $C_k$ obtained for each pilot subcarrier dedicated to the channel estimation=
−1.0526−0.2000i
−1.0982−0.7397i
−1.1439−1.2794i
−1.1895−1.8191i
−1.2351−2.3589i
−1.2807−2.8986i
−1.3263−3.4383i
−1.3719−3.9780i
Δ=−0.0456−0.5397i
PAPR of the signal before correction=9.4141 dB
PAPR of the signal after correction according to the method of the invention=8.0749 dB

7.1.3.2 On Reception,
$\tilde{\Delta}$=−0.0524−0.5338i
$\tilde{C}_k$=
−1.0605−0.2518i
−1.1129−0.7856i
−1.1653−1.3194i
−1.2177−1.8532i
−1.2701−2.3870i
−1.3225−2.9208i
−1.3749−3.4546i
−1.4273−3.9884i
∈ (estimation error of Δ such that ∈=Δ−$\tilde{\Delta}$)=0.0068−0.0059i
|∈|² (mean square error)=8.1050e−005

7.2 2nd Case: the Multiplicative Transition Law Used for Two Multicarrier Signals (OFDM), with Δ is Fixed and Equal to $e^{j2\pi/(2*8)}$

7.2.1 Simulation Parameters

| AWGN-type channel (with Gaussian noise channel) | |
|---|---|
| Modulation: | 16QAM |
| L: | 4 |
| FFT mode: | 2k |
| Guard time: | ¼ |
| Number of data subcarriers: | 1512 |
| $\Gamma_{max}$: | 10 dB |
| Amplifier model: SSPA | p = 100, IBO = 8.50 dB |
| Signal to noise ratio Eb/N0; | 7 dB |

7.2.2 Symbol 1
7.2.2.1 On Transmission
Index of 8 pilot subcarriers dedicated to reduction of the PAPR:

| 828 | 840 | 852 | 864 | 876 | 900 | 912 | 924 |
|-----|-----|-----|-----|-----|-----|-----|-----|

Value of the correction data $C_k$ obtained for each pilot subcarrier dedicated to the channel estimation=
−2.4861+1.8234i
−2.7941+1.3033i
−2.9947+0.7332i
−3.0802+0.1349i
−3.0473−0.4686i
−2.8973−1.0541i
−2.6360−1.5991i
−2.2734−2.0826i
Δ (fixed on transmission)=0.9808+0.1951i
PAPR of the signal before correction=10.2969 dB
PAPR of the signal after correction according to the method of the invention=9.2792 dB

7.2.2.2 On Reception,
$\tilde{\Delta}$ (since the receiver does not know it, it finds it by averaging)= 0.9762+0.01974i
$\tilde{C}_k$=
−2.5136+1.8617i
−2.8212+1.3212i
−3.0148+0.7329i
−3.0876+0.1204i
−3.0378−0.4919i
−2.8684−1.0798i
−2.5869−1.6203i
−2.2055−2.0923i
∈ (estimation error of Δ such that ∈=Δ−$\tilde{\Delta}$)=0.0046−0.0023i
|∈|² (mean square error)=2.6450e−005

7.2.3 Symbol 2
7.2.3.1 On Transmission,
Index of 8 pilot subcarriers dedicated to reduction of the PAPR:

| 828 | 840 | 852 | 864 | 876 | 900 | 912 | 924 |
|-----|-----|-----|-----|-----|-----|-----|-----|

Value of the correction data $C_k$ obtained for each pilot subcarrier dedicated to the channel estimation=
1.7448+0.9890i
1.5183+1.3104i
1.2335+1.5814i
0.9013+1.7917i
0.5344+1.9331i
0.1470+2.0002i
−0.2460+1.9904i
−0.6296+1.9042i
Δ (fixed on transmission)=0.9808+0.1951i
PAPR of the signal before correction=9.7290 dB
PAPR of the signal after correction according to the method of the invention=8.9491 dB

7.2.3.2 On Reception,
$\tilde{\Delta}$(since the receiver does not know it, it finds it by averaging)= 0.9681+0.2029i
$\tilde{C}_k$=
1.8883+0.8936i
1.6468+1.2481i
1.3410+1.5423i
0.9853+1.7651i
0.5958+1.9086i
0.1896+1.9685i
−0.2158+1.9441i
−0.6033+1.8382i
∈ (estimation error of Δ such that ∈=Δ−$\tilde{\Delta}$)=0.0127−0.0078i
|∈|² (mean square error)=2.2213e−004

Although the present disclosure has been described with reference to one or more examples, workers skilled in the art will recognize that changes may be made in form and detail without departing from the scope of the disclosure and/or the appended claims.

The invention claimed is:
1. A method comprising:
multicarrier transmission by a transmitter of a signal representing a source signal, comprising symbols including a set of subcarriers, transmitted simultaneously and comprising pilot subcarriers intended for at least one processing operation for assisting and/or improving decoding in at least one receiver, and data subcarriers, the location in time-frequency space and a reference value of said pilot subcarriers being known to the at least one receiver, wherein transmission comprises:
a phase of modifying, for a given symbol, the reference value of at least one subset of said pilot subcarriers, by correction data configured to correct phase and/or amplitude for each of said pilot subcarriers of said subset, so as to minimise peak-to-average power ratio, said correction data taking at least three distinct correction values, a transition between the correction values of two successive pilot subcarriers of said subset on a frequency axis being constant, and wherein the transition is predetermined according to a multiplicative or additive transition law.

2. The method according to claim 1, wherein said subset of said pilot subcarriers comprises pilot subcarriers belonging to at least one of the following categories:
pilot subcarriers dedicated to synchronisation;
pilot subcarriers dedicated to channel estimation;
signalling subcarriers containing information relating in particular to type of modulation, to transmission mode and/or to coding efficiency.

3. The method according to claim 2, wherein at least some of said pilot subcarriers are dedicated to channel estimation, and the method implements the following steps:
determining said correction data, comprising at least, for a given symbol:
a substep of calculating an initial correction parameter applied to a first pilot subcarrier dedicated to channel estimation $P_0$ on the frequency axis of said subset of said pilot subcarriers dedicated to channel estimation, and/or
a substep of calculating a transition parameter defining the transition value of a pilot subcarrier dedicated to channel estimation $P_i$ applied to the pilot subcarrier dedicated to estimation of the following channel $P_{i+1}$ on the frequency axis of said subset of said pilot subcarriers dedicated to channel estimation,
said initial correction parameter and said transition parameter being chosen so as to minimise the peak-to-average power ratio;
a substep of obtaining said correction data from said initial correction parameter and said transition parameter;
modifying the reference value of said pilot subcarriers dedicated to channel estimation according to said correction data, supplying corrected values intended to modulate said pilot subcarriers, dedicated to channel estimation, of said subset.

4. The method according to claim 3, wherein said obtaining substep determines said correction data according to said initial correction parameter for the pilot subcarrier dedicated to estimation of the channel with the lowest frequency, and according to the modification applied to the pilot subcarrier dedicated to the previous channel estimation on the frequency axis and according to the transition parameter, for the other pilot subcarriers dedicated to channel estimation.

5. The method according to claim 1, wherein said correction data, said initial correction parameter and/or said transition parameter are defined with a predetermined step and/or chosen from a set of predetermined values.

6. The method according to claim 1, wherein said transition uses a multiplicative transition law and an additive transition law.

7. The method according to claim 1, wherein the method implements a prior step of choosing said transition law, for a given symbol or a given series of symbols.

8. The method according to claim 7, wherein said prior step of choosing said transition law delivers binary choice information, and wherein the method implements a step of transmitting said choice information.

9. The method according to claim 1, comprising determining by a multiplicative transition law the modification to be applied to said pilot subcarrier dedicated to the channel estimation $P_{i+1}$ by multiplication of a correction parameter $C_i$ applied to said previous pilot subcarrier dedicated to the channel estimation $P_i$ on the frequency axis by said transition parameter.

10. The method according to claim 1, comprising determining by an additive transition law the modification to be applied to said pilot subcarrier dedicated to the channel estimation $P_{i+1}$ by adding a correction parameter $C_i$ applied to said previous pilot subcarrier dedicated to the channel estimation $P_i$ on the frequency axis by said transition parameter.

11. A device for multicarrier transmission of a signal representing a source signal, comprising symbols including a set of subcarriers, intended to be sent simultaneously and comprising pilot subcarriers dedicated to at least one processing operation assisting and/or improving decoding in at least one receiver, and data subcarriers, the location in the time-frequency space and a reference value of said pilot subcarriers being known to the at least one receiver, wherein the device comprises:
a processor configured to modify, for a given symbol, the reference value of at least one subset of said pilot subcarriers, using correction data configured to correct phase and/or amplitude for each of said pilot subcarriers of said subset, so as to minimise peak-to-average power ratio, said correction data taking at least three distinct correction values, a transition between the correction values of two successive pilot subcarriers of said subset on a frequency axis being constant, and wherein the transition is predetermined according to a multiplicative or additive transition law.

12. A method comprising:
producing with a transmitter a multicarrier signal comprising symbols including a set of subcarriers, intended to be sent simultaneously and comprising pilot subcarriers dedicated to at least one processing operation assisting and/or improving decoding in at least one receiver and data subcarriers, the location in the time-frequency space and a reference value of said pilot subcarriers being known to the at least one receiver, wherein, for a given symbol, the reference value of at least one subset of pilot subcarriers dedicated to channel estimation is modified, by a correction parameter configured to correct phase and/or amplitude of each of said pilot subcarriers of said subset, so as to minimise the peak-to-average power ratio, said correction parameters taking at least three distinct correction values, a transition between the correction values of two successive pilot subcarriers of said subset on a frequency axis being constant, and wherein the transition is predetermined according to a multiplicative or additive transition law; and
transmitting the signal from the transmitter.

13. The method according to claim 12, wherein the signal comprises at least one item of information assisting reception, from the information belonging to the group consisting of:
information representing said initial correction parameter;
information representing said transition parameter;

binary information representing choice of a transition law between two of said pilot subcarriers dedicated to the channel estimation of said subset.

14. A computer program product recorded on a non-transitory medium that can be read by computer and, wherein the product comprises program code instructions for implementing a method of multicarrier transmission by a transmitter of a signal representing a source signal, when the instructions are executed on a computer, wherein the signal comprises symbols including a set of subcarriers, transmitted simultaneously and comprising pilot subcarriers intended for at least one processing operation for assisting and/or improving decoding in at least one receiver, and data subcarriers, the location in time-frequency space and a reference value of said pilot subcarriers being known to the at least one receiver, wherein the method comprises:
a phase of modifying, for a given symbol, the reference value of at least one subset of said pilot subcarriers, by correction data configured to correct phase and/or amplitude for each of said pilot subcarriers of said subset, so as to minimise peak-to-average power ratio, said correction data taking at least three distinct correction values, a transition between the correction values of two successive pilot subcarriers of said subset on a frequency axis being constant, and wherein the transition is predetermined according to a multiplicative or additive transition law.

15. A method comprising:
receiving with a receiver a signal sent by at least one transmitter via a transmission channel,
said signal being formed from a temporal succession of symbols including a set of subcarriers, sent simultaneously and comprising pilot subcarriers dedicated to at least one processing operation for assisting and/or improving decoding in the receiver and data subcarriers,
the location in time-frequency space and a reference value of said pilot subcarriers being known to the receiver,
the reference value of at least one subset of said pilot subcarriers being modified, for a given symbol, by correction data correcting phase and/or amplitude of each of said pilot subcarriers of said subset, so as to minimise peak-to-average power ratio,
said correction data taking at least three distinct correction values, a transition between the correction values of two successive pilot subcarriers in said subset on the frequency axis being constant, and wherein the transition is predetermined according to a multiplicative or additive transition law;
extraction of information received modulating each of the subcarriers of said subset of carriers;
analysing all said information received, so as to determine an estimation of said correction data; and
estimating the transmission channel from said correction data.

16. The method according to claim 15, wherein said analysis step comprises:
a step of determining a transition parameter defining the transition value of a pilot subcarrier dedicated to the channel estimation $P_i$ to the pilot subcarrier dedicated to the following channel estimation $P_{i+1}$ on the frequency axis of said subset of said pilot subcarriers dedicated to the channel estimation, by analysing all the transitions; and/or
a step of determining an initial correction parameter $C_0$ applied to the first pilot subcarrier dedicated to the channel estimation $P_0$ on the frequency axis of said subset of said pilot subcarriers, according to the value of at least one of said pilot subcarriers of said subset of said pilot subcarriers dedicated to the channel estimation and the transition parameter;
a step of determining the correction parameters applied to all the other pilot subcarriers dedicated to the channel estimation $P_{i, i \neq 0}$ on the frequency axis of said subset of said pilot subcarriers dedicated to the channel estimation, according to the value of the initial correction parameter $C_0$ applied to the first pilot subcarrier dedicated to the channel estimation $P_0$ and that of the transition parameter.

17. The method according to claim 16, wherein at least one of said determination steps uses averaging.

18. The method according to claim 16 wherein, for at least one of said determination steps, said initial correction parameter and/or said transition parameter is defined with a predetermined step and/or one chosen from a set of predetermined values.

19. The method according to claim 15, wherein the method comprises a prior step of decoding at least one of the items of information belonging to the group consisting of:
information representing said initial correction parameter;
information representing said transition parameter;
binary information representing choice of a transition law between two of said pilot subcarriers dedicated to the channel estimation of said subset.

20. A device comprising:
a receiver configured to receive a signal sent by at least one transmitter via a transmission channel,
said signal being formed by a temporal succession of symbols including a set of subcarriers, sent simultaneously and comprising pilot subcarriers dedicated to at least one processing operation assisting and/or improving decoding in the receiver, and data subcarriers,
the location in time-frequency space and a reference value of said pilot subcarriers being known to the receiver,
the reference value of at least one subset of said pilot subcarriers dedicated to a channel estimation being modified, for a given symbol, by correction data correcting the phase and/or amplitude of each of said pilot subcarriers of said subset, so as to minimise peak-to-average power ratio,
said correction data taking at least three distinct correction values, a transition between the correction values of two successive pilot subcarriers of said subset on a frequency axis being constant, and wherein the transition is predetermined according to a multiplicative or additive transition law;
means for extracting received information modulating each of the subcarriers of said subset of carriers;
means for analysing all said information received, so as to determine an estimation of said correction data; and
means for estimating the transmission channel from said correction data.

21. A computer program product recorded on a non-transitory medium that can be read by computer, wherein the product comprises program code instructions for implementing a method of receiving a signal sent by at least one transmitter via a transmission channel, when the instructions are executed on a computer,
said signal being formed from a temporal succession of symbols including a set of subcarriers, sent simultaneously and comprising pilot subcarriers dedicated to at least one processing operation for assisting and/or improving decoding in a receiver and data subcarriers,
the location in time-frequency space and a reference value of said pilot subcarriers being known to the receiver, the reference value of at least one subset of said pilot subcarriers being modified, for a given symbol, by correction data correcting phase and/or amplitude of each of said pilot subcarriers of said subset, so as to minimise peak-to-average power ratio, said correction data taking at least three distinct correction values, a transition between the correction values of two successive pilot subcarriers in said subset on the frequency axis being constant, and wherein the transition is predetermined according to a multiplicative or additive transition law, wherein the method comprises:
    extraction of information received modulating each of the subcarriers of said subset of carriers;
    analysing all said information received, so as to determine an estimation of said correction data; and
    estimating the transmission channel from said correction data.

\* \* \* \* \*